(12) United States Patent
Taha et al.

(10) Patent No.: US 10,370,305 B1
(45) Date of Patent: Aug. 6, 2019

(54) ENCAPSULATED POLYMER NANOCOMPOSITE FOR EFFICIENT CRACK REPAIR AND MONITORING OF CEMENT, ROCK, AND OTHER BRITTLE MATERIALS

(71) Applicant: STC.UNM, Albuquerque, NM (US)

(72) Inventors: Mahmoud Reda Taha, Albuquerque, NM (US); John Stormont, Albuquerque, NM (US); Edward N. Matteo, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 15/681,981

(22) Filed: Aug. 21, 2017

Related U.S. Application Data

(60) Provisional application No. 62/377,270, filed on Aug. 19, 2016.

(51) Int. Cl.
| | |
|---|---|
| *C04B 41/45* | (2006.01) |
| *C04B 41/49* | (2006.01) |
| *C04B 41/48* | (2006.01) |
| *C04B 41/50* | (2006.01) |
| *C09K 8/44* | (2006.01) |
| *C09K 8/42* | (2006.01) |
| *E21B 33/138* | (2006.01) |
| *C04B 111/34* | (2006.01) |
| *C04B 111/00* | (2006.01) |

(52) U.S. Cl.
CPC .......... *C04B 41/455* (2013.01); *C04B 41/457* (2013.01); *C04B 41/483* (2013.01); *C04B 41/4853* (2013.01); *C04B 41/4884* (2013.01); *C04B 41/4961* (2013.01); *C04B 41/5001* (2013.01); *C04B 41/5006* (2013.01); *C09K 8/428* (2013.01); *C09K 8/44* (2013.01); *E21B 33/138* (2013.01); *C04B 2111/00008* (2013.01); *C04B 2111/00663* (2013.01); *C04B 2111/343* (2013.01); *C04B 2111/346* (2013.01)

(58) Field of Classification Search
CPC ... C04B 41/455; C04B 41/457; C04B 41/483; C04B 41/4853; C04B 41/4884; C04B 41/4961; C04B 41/5001; C04B 41/5006; C04B 2111/00008; C04B 2111/00663; C04B 2111/343; C04B 2111/346; C09K 8/428; C09K 8/44; E21B 33/138
USPC .......................................................... 524/441
See application file for complete search history.

(56) References Cited

U.S. PATENT DOCUMENTS 6,518,330 B2 * 2/2003 White .................. B29C 73/163
523/200
8,846,801 B1 9/2014 Harman et al.

FOREIGN PATENT DOCUMENTS

WO WO-2014081930 A1 * 5/2014 ............. B29C 73/22

OTHER PUBLICATIONS

White et al., "Autonomic healing of polymer composites," Nature, vol. 409, pp. 794-797. (Year: 2001).*
Yan et al., "Study of factors related to performance improvement of self-healing epoxy based on dual encapsulated healant," Polymer, 50, pp. 5771-5781. (Year: 2009).*

(Continued)

*Primary Examiner* — Josephine L Chang
(74) *Attorney, Agent, or Firm* — Vogt IP; Keith A. Vogt

(57) ABSTRACT

The present invention concerns compositions and methods of using the same that provide encapsulated polymer nanocomposites for efficient crack repair and monitoring of a cement-substrate interface.

20 Claims, 3 Drawing Sheets

⦿ Microcapsules including high molecular weight polymer and nanomaterials
○ Catalyst

(56) References Cited

OTHER PUBLICATIONS

Baghdachi, "Chapter 1: Design and Development of Self-Healing Polymers and Coatings," Smart Coatings III: ACS Symposium Series, Washington, DC: American Chemical Society, pp. 1-16. (Year: 2010).*
Abel, M-L, Watts, J, Digby, R. (2004) The Influence of Process Parameters on The Interfacial Chemistry of gamma-GPS on Aluminum: A Review, Journal of Adhesion, vol. 80, No. 4, pp. 291-312(22).
Agbasimalo, N., and Radonjic, M. (2012) Experimental Study of Portland Cement/Rock Interface in Relation to Wellbore Stability for Carbon Capture and Storage (CCS). 46th US Rock Mechanics/Geomechanics Symposium 2012; Chicago Illinois. 3:2212-2220.
Aïssa, B, Therriault, D, Haddad, E, Jamroz, W (2012) Self-healing materials systems: overview of major approaches and recent developed technologies. Advanced Materials Science and Engineering, 2012: Article ID 854203, 17 p.
Al Qabany, A, Soga, K, Santamarina, C, (2011), Factors affecting efficiency of microbially induced calcite precipitation, Journal of Geotechnical and Geoenvironmental Engineering, 138 : 992-1001.
Andrade, JD, Sangesland, S, Vrålstad, T, Golan, M (2014) Cement Sheath Integrity Implications of Scaled-Down Wellbore-casing-cement-formation sections. Proceedings of the ASME 2014 $33^{rd}$ International Conference on Ocean, Offshore and Arctic Engineering, 1-9.
ASTM C 882-05 Standard Test Method for Bond Strength of Epoxy-Resin Systems Used With Concrete by Slant Shear. ASTM International, West Conshohocken, PA (2005).
Avila, A, Duarte, HV, Soares, MI (2006) The nanoclay influence on impact response of laminated plates. Latin Am. J. of Solids and Structures, 3:3-20.
Ayme, JC, Emery, J, Lavielle, L, Lischetti, G, Schultz, J (1992) Wettability of poly(methyl methacrylate) surfaces in dental use. Journal of Materials Science. Materials in Medicine: 3 (5): 387-390.
Bachu, S, and Bennion, DB (2009), Experimental assessment of brine and/or CO2 leakage through well cements at reservoir conditions, Int. Journal of Greenhouse Gas Control, vol. 3, pp. 494-501.
Bakar, M, Kostrzewa, M, Hausnerova, B, Sar, K (2010) Preparation and Property Evaluation of Nanocomposites Based on Polyurethane- Modified Epoxy/Montmorillonite Systems. Advances in Polymer Tech., 29:237-248.
Balasubramanian, K, and Burghard, M (2004) Chemically Functionalized Carbon Nanotubes. Small, 1(2):180-192.
Baldan, A (2004) Adhesively-bonded joints and repairs in metallic alloys, polymers and composite materials: Adhesives, adhesion theories and surface pretreatment. Journal of Materials Science, vol. 39, No. 1, pp. 1-49.
Baumgarte, C, Thiercelin, M, Klaus, D (1999) Case Studies of Expanding Cement to Prevent Microannular Formation, SPE Paper 56535, Oct. 6.
Benge, G (2009) Improving wellbore seal integrity in CO2 injection wells, Energy Procedia, vol. 1, pp. 3523-3529.
Berry, DH, Namkanisorn, A (2005) Fracture toughness of Silane Coupled Polymer-Metal Interface: Silane Concentration Effects. The Journal of Adhesion, vol. 81, pp. 347-370.
Binder, WH, (2013) Self-Healing Polymers From Principles to Applications. Wiley-VCH, Verlag GmbH, Weinheim, Germany.
Boguslaysky, Y, Fadida, T, Talyosf, Y, Lellouche, J-P (2011) Controlling the wettability properties of polyester fibers using grafted functional nanomaterials. J. Material Chemistry, 21: 10304-10310.
Bois, A-P, Rodot, AGF, Saint-Marc, J, Aimard, N (2011). How to prevent loss of zonal isolation through a comprehensive analysis of microannulus formation. SPE Drilling & Completion 26. 1, pp. 13-31.
Bowen, BB, Ochoa, RI, Wilkens, ND, Brophy, J, Lovell, TR, Fischietto, N, Medina, CR, and Rupp, JA, (2011). Depositional and diagenetic variability within the Cambrian Mount Simon Sandstone: Implications for carbon dioxide sequestration. Environmental Geosciences 18(2), 69-89.
Brannon, RA, Fossum, AF, Strack, OE (2009) Kayenta: Theory and User's Guide. Sandia National Laboratories, SAND2009-2282. Albuquerque, NM.
Cailly, B, Le Thiez, P, Egerman, P, Audibert, A, Vidal-Gilbert, S, Longaygue, X (2005) Geologic Storage of CO2: A State-of-theArt of Injection Processes and Technologies, Oil & Gas Science and Technology—Rev. IFP, vol. 60, No. 3, pp. 517-525.
Carey, JW, Wigan, M, Chipera, SJ, WoldeGabriel, G, Pawar, R, Lichtner, PC, Wehner, SC, Rainers, MA, Guthrie Jr., GD (2007) Analysis and performance of oil well cement with 30 years of CO2 exposure from the SACROC Unit, West Texas, USA. Int. J. Greenhouse Gas Control 1, 75-85.
Carey, JW, Lei, Z, Rougier, E, Mori, H, and Viswanathan, HS (2015). Fracture-permeability behavior of shale. Journal of Unconventional Oil and Gas Resources, 11:27-43.
Chen, Y, Kushner, AM, Williams, G, Guan, Z (2012) Multiphase design of autonomous self-healing thermoplastic elastomers. Nature Chemistry, 4: 467-472.
Chiang, C-L, Chang, R-C, Chiu, Y-C (2007) Thermal stability and degredation kinetics of novel organic/inorganic epoxy hybrid containing nitrogen/silicon/phosphorus by sol-gel-method. Thermomechanica Acta, vol. 453, pp. 97-104.
Chiang, C-L, and Hsu, S-W (2010) Novel epoxy/expandable graphite halogen-free flame retardant composites-preparation, characterization and properties. Journal of Polymer Science, 17:315-323.
Chung, DDL (2001) Interface Engineering for Cement-matrix Composites. Composite Interfaces, 8(1):67-81.
Coleman, JN, Khan, U, Blau, WJ, Gun'ko, YK (2006) Small but Strong: A Review of the Mechanical Properties of Carbon Nanotube—Polymer Composites. Carbon, vol. 44, pp. 1624.
Connell, L, Down, D, Lu, M, Hay, D, Heryanto, D (2015) An investigation into the integrity of wellbore cement in CO2storagewells: Core flooding experiments and simulations. International journal of greenhouse gas control.37:424-440.
Cunningham, AB, Phillips, AJ, Troyer, E, Lauchnor, E, Hiebert, R, Gerlach, R, Spangler, L, (2014),Wellbore leakage mitigation using engineered biomineralization, Energy Procedia, 63: 4612-4619.
Dalton, AB, Collins, S, Munoz, E, Razal, JM, Ebron, VH, Ferraris, JP, Coleman, JN, Kim, BG, Baughman, RH (2003) Super-Tough Carbon-Nanotube Fibres. Nature, 423(6941):703.
Dewers, T., Newell, P, Broome, S, Heath, J, and Bauer, S, (2014), Geomechanical Behavior of Cambrian Mount Simon Sandstone Lithofacies, Iowa Shelf, USA. International Journal of Greenhouse Gas Control, 21, 33-48.
Douba, AE, Matteo, E, Stormont, J, Reda Taha, MM (2015) Apparent vs. True Bond Strength of Steel and PC with Nanoalumina, Proceedings of International Congress on Polymers in Concrete (ICPIC), Singapore, Oct. 2015, 10 p.
Duguid, AJ, and, Scherer, GW (2010) Degradation of oil well cement due to expo- sure to carbonated brine. International Journal of Greenhouse Gas Control, 4, pp. 546-560.
Duncan, B, Mera, R, Leatherdale, D, Taylor, M, Musgrove, R (2005) Techniques for charaterising the wetting, coating and spreading of adhesives and surfaces. National Physics Laboratory, United Kingdom.
Edwards, HC, and, Stewart, JR (2001) Sierra: A Software Environment for Developing Complex MultiPhysics Applications. Amsterdam: Elsevier, 2001. In K. J. Bathe (ed.), First MIT Conference on Computational Fluid and Solid Mechanics.
Fu, Z, and Chung, DDL (1997) Bond Strength and Contact Electrical Resistivity between Cement and Stainless Steel Fibers: Their Correlation and Dependence on Fiber Surface Treatment and Curing Age. ACI Materials Journal, 94(3):203-208.
Genedy, M, Daghash, S, Soliman, E, Reda Taha, MM (2015) Improving Fatigue Performance of GFRP Composites Using Carbon Nanotubes. Fibers, vol. 3: 3-29.
Genedy, M, Stormont, J, Matteo, E, and Reda Taha, MM (2014) Examining Epoxy-based Nanocomposites in Wellbore Seal Repair for Effective CO2 Sequestration. Energy Procedia, vol. 63, pp. 5798-5807.

(56) References Cited

OTHER PUBLICATIONS

Gerstle, W, Lenke, LR, Reda Taha, MM, Magallanes, JM, Martinez, R, Hays, JS, Cabrera, AS (2010) Comparison of Direct Stiff Tension and Notched Beam Fracture Test Results. CD Proceedings of 7th Int. Conference on Fracture Mechanics of Concrete and Concrete Structures, South Korea.
Gonjy, FH, Wichmann, MHG, Köpke, U, Fiedler, B, Schulte, K (2004) Carbon Nanotube-reinforced Epoxy Composites: Enhanced Stiffness and Fracture Toughness at Low Nanotube Content. Comp. Sci. and Tech., 64: 2363-2371.
Goodwin, KJ, and Crook, RJ (1992) Cement Sheath Stress Failure, SPE Drilling Engineering, vol. 7, No. 2, pp. 291-296.
Grujicic, M, Sellappan, V, Omar, MA, Seyr, N, Erdmann, M, Holzeitner, J (2008), An overview of the polymer-to-metal direct adhesion hybrid technologies for load-bearing automotive components. Journal of Materials Processing Technology, vol. 197, pp. 363-373.
Hawkes, CD, McLellan, PJ, Bachu, S (2005) Geomechnical Factors Affecting Geological Storage of $CO_2$ in Depleted Oil and Gas Reservoirs, Journal of Canadian Petroleum Technology, vol. 44, Issue 10, pp. 52-61.
Heath, J, Dewers, T, McPherson, B, Petrusak, R, Chidsey, T, and Rinehart, A, (2011), Pore networks in continental and marine mudstones: characteristics and controls on sealing behavior. Geosphere 7, 429-454.
Hosseini, SA, Lashgari, H, Choi, JW, Nicot, JP. Lu, J, Hovorka, SD (2013) Static and dynamic reservoir modeling for geological $CO_2$ sequestration at Cranfield, Mississippi, U.S.A. International Journal of Greenhouse Gas Control, v. 18, p. 449-462.
Hovorka, SD, Meckel, TA, Trevino, RH (2013) Monitoring a large-volume injection at Cranfield, Mississippi—Project design and recommendations, International Journal of Greenhouse Gas Control, v. 18, p. 345-360.
Howarter, JA, Youngblood, JP (2007) Surface Modification of Polymers with 3-Aminopropyltriethoxysilane as a General Pretreatment for Controlled Wettability. Macromolecules, 2007, 40, 1128-1132.
Huang, X, and Netravali, A (2007) Characterization of flax fiber reinforced soy protein resin based green composites modified with nano-clay particles. Composite Science & Technology, 67:2005-2014.
IEA Greenhouse Gas &D Programme (IEA GHG). Long Term Integrity of $CO_2$ Storage—Well Abandonment, Aug. 2009, Jul. 2009.
Kessler, MR, Sottos, NR White, SR (2003) Self-healing structural composite materials. Compos Part A Appl S 34(8):743-53.
Kim, JJ, Rahman, MK, Reda Taha, MM (2012) Examining Microstructural Composition of Hardened Cement Paste Cured Under High Temperature and Pressure Using Nanoindentation and 29Si MAS NMR. J. of Applied Nanoscience, 2(4):445-456.
Kutchko, BG, Strazisar, BR Lowry, GV, Dzombak, DA, Thaulow, N, (2007) Degradation of well cement by $CO_2$ under geologic sequestration conditions. Environmental Science and Technology, 41, 4787-4792.
Kutchko, BG, Strazisar, BR, Lowry, GV, Dzombak, DA, Thaulow, N (2008) Rate of $CO_2$ attack on hydrated Class H well cement under geologic sequestration conditions. Environmental Science and Technology, 42, 6237-6242.
Jin, H. and Lu, W.-Y., (2013), 3D deformation field throughout the interior of materials. Sandia National Laboratory SAND Report SAND2013-7824, 25p.
Ladva, HKJ, Craster, B, Jones, TGJ, Goldsmith, G, Scott, D (2005) The Cement-to-Formation Interface in Zonal Isolation. SPE Drilling & Completion, 20(3):186-197.
Leetaru, HE, and McBride, JH, (2009). Reservoir uncertainty, Precambrian topography, and carbon sequestration in the Mt. Simon Sandstone, Illinois Basin. Env. Geosciences 16(4), 235-243.
Li X, and Bhushan, B (1999) Micro/nanomechanical and tribological characterization of ultrathin amorphous carbon coatings, Journal of Materials Research,14: 2328-2337.

Lippmaa, E, Mägi, M et al. (1980) Structural studies of silicates by solid-state high-resolution 29Si NMR. Am. Chem. Soc., 102:4889-4893.
Liteanu, E, Spiers, CJ, Peach, CJ (2008) Failure behaviour wellbore cement in the presence of water and supercritical $CO_2$. Energy Procedia, 1:3553-3560.
Liu, YL, Wu, CS, Hus, KY, Chang, TC (2002) Flame-retardant epoxy resin from o-cresol novolac epoxy cured with a phosphorus-containing aralkyl novolac. Polymer Chemistry, 40(14):2329-2339.
Lu, J, Kordi, M, Hovorka, SD, Meckel, TA, Christopher, CA (2013) Reservoir characterization and complications for trapping mechanisms at Cranfield $CO_2$ injection site. International Journal of Greenhouse Gas Control, 18:361-374, Oct. 2013.
Macomber, RS (1998) A Complete Introduction to Modern NMR Spectroscopy, John Wiley & Sons.
Majchrzak, M, Hine, PJ. Khosravi, E (2012) An autonomous self-healing system based on ROMP of norbornene dicarboximide monomers. Polymer 53, 5251-5257.
Mansur, AAP, Santos, DB, Mansur, HS (2007) A microstructural approach to adherence mechanism of poly(vinyl alcohol) modified cement systems to ceramic tiles. Cem. Conc. Res., 37(2):270-282.
Martinez, MJ, Stone, CM, Notz, PK, et al. (2011) Computational Thermal, Chemical, Fluid and Solid Mechanics for Geosystems Management. Tech. Rept. SAND2011-6643. Sandia National Laboratories, Albuquerque, NM.
Martinez, MJ, Newell, P., Bishop, JE, Turner, DZ (2013) Coupled multiphase flow and geomechanics model for analysis of joint reactivation during $CO_2$ sequestration operations, Int. Journal of Greenhouse Gas Control, vol. 17, 148-160, Sep. 2013.
Matteo, EN, and Scherer, GW (2012) Experimental Study of the Diffusion-Controlled Acid Degradation Kinetics of Class H Portland Cement, International Journal of Greenhouse Gas Control, vol. 7, p. 181-191.
Miller, M, Bobko, C, Vandamme, M, Ulm, F-J (2008) Surface roughness criteria for cement paste nanoindentation. Cem. and Conc. Res., 4(38):467-476.
Mondal, P, Shah, SP, Marks, L (2007) A Reliable Technique to Determine the Local Mechanical Properties at the Nano-Scale for Cementitious Materials. Cem. and Conc. Res., 37:1440-1444.
Mozley, P, Heath, J, Dewers, T, and Bauer, S, (2015), Origin and size distribution of porosity in the Mount Simon Sandstone and Eau Claire Formations: Implications for multiphase flow. Submitted to Geosphere.
Muhuri, S, Dewers, T, Scott, T and Reches, Z, (2003), Interseismic fault strengthening and earthquake-slip instability: Friction or cohesion? Geology 31, 881-884.
Nakayama, M, and Beaudoin, JJ (1987) A Novel Technique for Determining Bond Strength Development Between Cement Paste and Steel. Cem. and Conc. Res., 17(3):478-488.
Namkanisorn, A, Ghatak, A, Chaudhury, MK, Berry, DH (2001) "A Kinetic Approach to Study the Hydrolytic Stability of Polymer-Metal Adhesion", Journal of Adhesion Science and Technology. vol. 15, pp. 1725-1745.
Nasir, O, and Fall, M (2008) Shear behaviour of cemented pastefill-rock interfaces. Engineering Geology, 101:146-153.
National Energy Technology Laboratory (NETL). Best Practices for Carbon Storage Systems and Well Management Activities. DOE/NETL-2001/1458, Dec. 2011.
Ngo, T-D, Ton-That, M-T, Hoa, S., Cole, KC (2009) Preparation and properties of Epoxy Nanocomposites 1-The Effect of Premixing on Dispersion of Organoclay. Polymer Eng. and Sci., 49:666-672.
Nicot, J-P, Oldenburg, CM, Houseworth, JE, Choi, J-W (2013) Analysis of potential leakage pathways at Cranfield, MS, U.S.A., $CO_2$ sequestration site, International Journal of Greenhouse Gas Control, v. 18, p. 388-400.
Notz, PK, Subia, SR Hopkins, MM, Moffat, HK, Noble, D (2007) Aria 1.5: User Manual SAND2007-2734. Sandia National Laboratories Technical Report, Albuquerque, NM.
Orlic, B (2008) Some Geomechanical Aspects of Geological $CO_2$ Sequestration, 12th International Conference of the International Association for Computer Methods and Advances in Geomechanics, Goa, India, Oct. 1-6, pp. 2204-2212.

(56) References Cited

OTHER PUBLICATIONS

Park, JH, and Jana, SC (2003) Mechanism of Exfoliation of Nanoclays Particles in Epoxy- Clay Nanocomposites. Macromolecules, 36:2758-2768.
Petty, S, Gastineau, J, Bour, DL, Ravi, K (2003) Life Cycle Modeling of Wellbore Cement Systems Used for Enhanced Geothermal System Development, Proceedings Twenty-Eighth Workshop on Geothermal Reservoir Engineering, Stanford University, Stanford, California, Jan. 27-29.
Person, M, Banerjee, A, Rupp, J, Medina, C, Lichtner, P, Gable, C, Pawar, R, Celia, M, McIntosh, J, and Bense, V, (2010). Assessment of basin-scale hydrologic impacts of CO2 sequestration, Illinois Basin. International Journal of Greenhouse Gas Control 4, 840-854.
Phillips, AJ, Gerlach, R, Lanchnor, E, Mitchell, AV, Cunningham, AB, Spangler, L (2013), Engineered applications of ureolytic biomineralization: a review. Biofouling, 29: 715-733.
Qian, M, Soutar, AM, Tan. XH, Zeng, XT, Wijesinghe, SL (2009) Two-part epoxy-siloxane hybrid corrosion protection coatings for carbon steel. Thin Solid Films, 517(17):5237-5242.
Randall, NX, and Consiglio, R (2000) Nanoscratch tester for thin film mechanical properties characterization. Review of Scientific Instruments, 71(7): 2796-2799.
Ravi, K, and Bosma, M (2002) Improve the Economics of Oil and Gas Wells by Reducing the Risk of Cement Failure, SPE 74497, IADC/SPEDrilling Conference, Dallas, Texas, Feb. 26-28.
Ren, Y, Fu, YQ, Liao, K, Li, F, Cheng, HM (2004) Fatigue failure mechanisms of single-walled carbon nanotube ropes embedded in epoxy. Applied Physics Letters, 84:2811-2813.
Rinehart, A, Broome, S, and Dewers, T (2015) Mechanical variability and constitutive behavior of the Lower Tuscaloosa Formation supporting the SEACARB Phase III Co2 injection program at Cranfield Site. Submitted to AAPG Bulletin.
Sierra Solid Mechanics Team, 2010. Adagio 4.18 User's Guide. SAND2010-6313, Sandia National Laboratories, Albuquerque, New Mexico.
Sierra Solid Mechanics Team, 2011. Sierra/Solid Mechanics 4.22 User's Guide. SAND2011-7597, Sandia National Laboratories, Albuquerque, New Mexico.
Sobolik, SR, Gomez, SP, Matteo, EN, Dewers, TA, Newell, P, Reda Taha, M, Stormont, JC (2015) Geomechanical Modeling to Predict Wellbore Stresses and Strains for the Design of Wellbore Seal Repair Materials for Use at a CO2 Injection Site. Proceedings of the 49th US Rock Mechanics / Geomechanics Symposium held in San Francisco, CA, USA, Jun. 28-Jul. 1, 2015.
Soliman, E, Kandil, UF, Reda Taha, MM (2012a) The Significance of Carbon Nanotubes on Styrene Butadiene Rubber (SBR) and SBR Modified Mortar. Materials and Structures, in Press.
Soliman, E, Kandil, U, and Reda Taha, MM (2012b) Limiting Shear Creep of Epoxy Adhesive at the FRPConcrete Interface Using Multi-Walled Carbon Nanotubes. International Journal of Adhesion and Adhesives, 33:36-44.
Sperling, LH, (2001) Introduction to Physical Polymer Science, 3rd Edition. Wiley-Interscience, John Wiley & Sons, NY.
Stormont, JC, Ahmad, R, Ellison, J, Reda Taha, MM, Matteo, EN (2015) Laboratory measurements of flow through wellbore cement-casing microannuli, in Proceeding of the 49th US Rock Mechanics/ Geomechanics Symposium, San Francisco, June.
Su WF, Lee Y-C, Pan, W-P (2002) Thermal properties of phthalic anhydride and phenolic resin-cured rigid rod epoxy resins. Thermochimica Acta, 398-398.
Sun, X, Zhang, G, Keynton, RS, O'Toole, MG, Patel, D, Gobin, AM (2013) Enhanced drug delivery via hyperthermal membrane disruption using targeted gold nanoparticles with PEGylated Protein-G as a cofactor. Nanomedicine: Nanotechnology, Biology, and Medicine, 9: 1214-1222.
Ulm, F.-J, Vandamme, M, Bobko, C, Ortega, JA (2007) Statistical indentation techniques for hydrated nanocomposites: concrete, bone, and shale. J. of the Am. Ceramic Soc., 90:2677-2692.
Wang, P-I, Bult, J, Ghoshal, R, Ghosal, R, Lu, T-M (2011) Rapid ultraviolet-curing of epoxy siloxane films. Mat. Chem. and Phy., 129(3):678-682.
Watson, TL, and Bachu, S. Identification of Wells With High CO2-Leakage Potential in Mature Oil Fields Developed for CO2-Enhanced Oil Recovery. SPE 112924-MS, 2008.
Wieker, W., A.-R. Grimmer, et al. (1982) Solid-state high-resolution 29Si NMR spectroscopy of synthetic 14Å, 11and 9Å tobermorites. Cem. and Conc. Res., 12:333-339.
Xu J, and Yao, W (2011) Nano-scratch as a new tool for assessing the nano-tribological behavior of cement composite, Materials and Structures, 44(9):1703-1711.
Xu, Y, and Chung, DDL (1999) Carbon fiber reinforced cement improved by using silane-treated carbon fibers. Cem. and Conc. Res., 29(5):773-776.
Yin, T, Rong MZ, Zhang MQ, Yang GC (2007) Self-healing epoxy composites—preparation and effect of the healant consisting of microencapsulated epoxy and latent curing agent. Compos Sci Technology, 67 (2):201-12.
Zeng, JJ, Saltysiak, B, Johnson, WS, Schiraldi, DA, Kumar, S (2004) Processing and properties of poly(methyl methacrylate)/carbon nano fiber composites. Composites Part B-Engineering, 35:173-178.
Zhai, L, Ling ,G, Li, J, Wang, Y (2006) the effect of nanoparticles on the adhesion of epoxy adhesive. Materials Letters. 60: 3031-3033.
Zhang, M, and Bachu, S (2011) Review of integrity of existing wells in relation to CO2 geological storage: What do we know?, International Journal of Greenhouse Gas Control , vol. 5, pp. 826-840.
Zhi, CY, Bando, Y, Terao, T, Tang, C, Golberg, D (2010) Dielectric and thermal properties of epoxy/boron nitride nanotube composites, Pure Applied Chemistry, 82 (11): 2175-2183.
Zhou, T, Wang, X, Cheng, P, Wang, T, Xiong, D, Wang, X (2013) Improving the thermal conductivity of epoxy resin by the addition of a mixture of graphene nanoplatelets and silicon carbide microparticles. Express Polymers Letters, 7 (7): 584-594.
Zhou, Q, Birkholzer, JT, Mehnert, E, Lin, Y-F and Zhang, K, (2010). Modeling basin- and plume-scale processes of CO2 storage for full-scale deployment. Ground Water 48(4), 494-514.

* cited by examiner

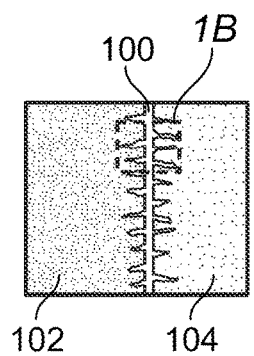

FIG. 1A

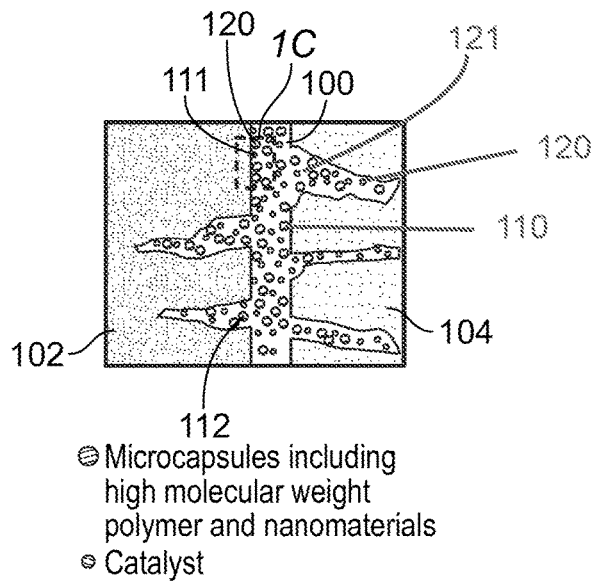

- Microcapsules including high molecular weight polymer and nanomaterials
- Catalyst

FIG. 1B

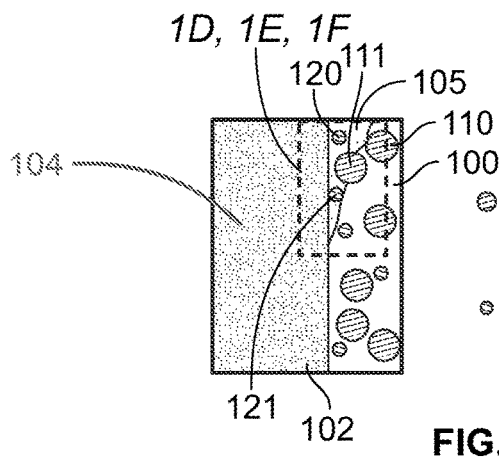

- Microcapsules including high molecular weight polymer and nanomaterials
- Catalyst

FIG. 1C

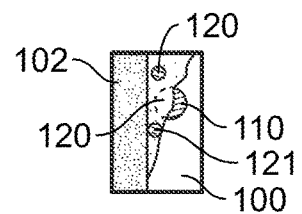

- Microcapsules including high molecular weight polymer and nanomaterials
- Catalyst

FIG. 1D

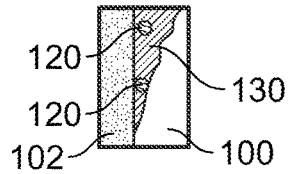

- Microcapsules including high molecular weight polymer and nanomaterials
- Catalyst

FIG. 1E

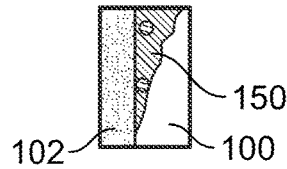

- Microcapsules including high molecular weight polymer and nanomaterials
- Catalyst

FIG. 1F

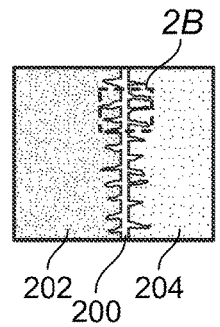

FIG. 2A

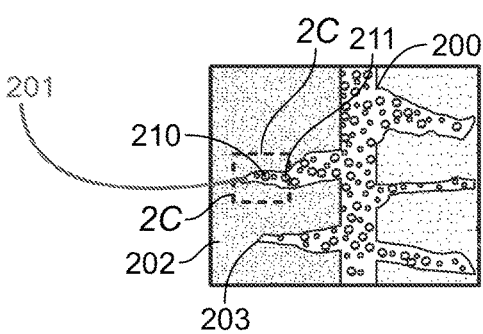

- Specially designed microcapsules including high molecular weight polymer and nanomaterials. Microcapsules sensitive to pressure, temperature and humidity gradients
- Catalyst

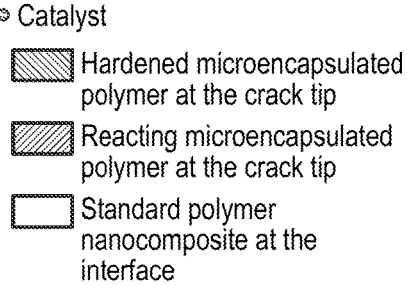

FIG. 2B

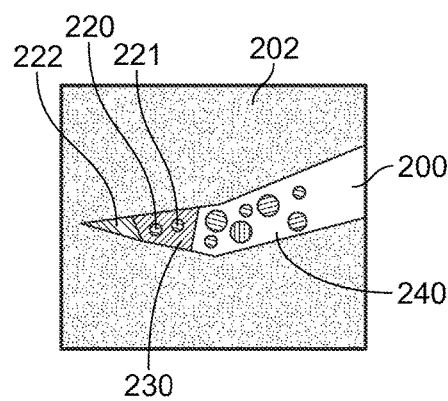

- Specially designed microcapsules including high molecular weight polymer and nanomaterials. Microcapsules sensitive to pressure, temperature and humidity gradients
- Catalyst

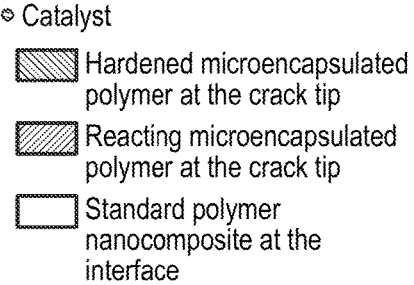

FIG. 2C

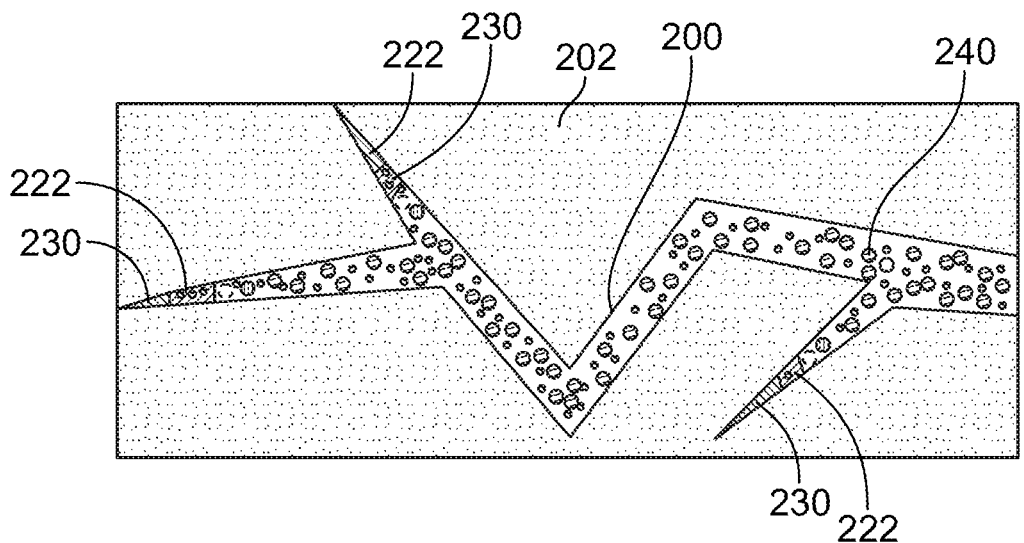
- Specially designed microcapsules including high molecular weight polymer and nanomaterials. Microcapsules sensitive to pressure, temperature and humidity gradients
- Catalyst
 Hardened microencapsulated polymer at the crack tip
 Reacting microencapsulated polymer at the crack tip
 Standard polymer nanocomposite at the interface
FIG. 3

ENCAPSULATED POLYMER NANOCOMPOSITE FOR EFFICIENT CRACK REPAIR AND MONITORING OF CEMENT, ROCK, AND OTHER BRITTLE MATERIALS

RELATED APPLICATIONS

This application claims the benefit of U.S. Provisional Application No. 62/377,270, filed Aug. 19, 2016 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Crack repair in cement, concrete, glass, rock/geomaterials, brittle materials and other substrates using polymer injection is a well-known and widely used technology. A major challenge of this technology is the common risk of further propagating the crack inside the cement, rock, or material body due to injection pressure.

BRIEF SUMMARY OF THE INVENTION

In one embodiment, the present invention provides an encapsulated polymer material to prevent crack propagation during injection.

In another embodiment, the present invention provides an encapsulated polymer material to arrest crack growth at the crack tip, making crack injection much easier and widening its applicability and implementation.

In other embodiments, the present invention provides materials to repair flaws (voids, fractures, degraded interfaces) in seal systems in wellbores that penetrate rock (e.g. shale) formations used for the sequestration of $CO_2$.

In yet other aspects, the present invention provides encapsulated polymer nanocomposites using microencapsulation. The microcapsules are sensitive to pressure, temperature and/or humidity or their gradients.

In further aspects, the present invention provides microcapsules having polymers with delivery capabilities that are controlled by temperature, pressure, humidity, or their gradients.

In other embodiments, the present invention provides polymeric nanocomposites that are synthesized for use as seal repair materials.

In other embodiments, the present invention provides polymer nanocomposites that are synthesized for improving acoustic contrast behind the casing to enable efficient ultrasonic monitoring.

In yet other embodiments, the present invention provides polymer nanocomposites that enhance and preserve wellbore-rock integrity.

In yet other embodiments, the present invention provides polymer nanocomposite seal repair materials suitable for wellbore environments that have high bond strength to rock, steel and cement; low permeability; high fracture toughness (resistance to crack growth); self-healing characteristics; and the capability to limit crack growth at the crack tips during injection.

In yet other embodiments, the present invention provides polymer nanocomposites that repair flaws in degraded cement-rock and cement-steel.

In yet other embodiments, the present invention provides polymer nanocomposites that enable efficient ultrasonic monitoring of crack propagation and crack arrest mechanisms by incorporating nanomaterials with high acoustic contrast.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIGS. 1A, 1B, 1C, 1D, 1E and 1F are schematic representations of the self-healing mechanics at the cement-rock interface for an embodiment of the present invention.

FIGS. 2A, 2B and 2C are schematic representations of polymers incorporating microcapsules sensitive for temperature, pressure, humidity, or their gradients for controlled delivery for an embodiment of the present invention.

FIG. 3 is a schematic representation showing crack arrest at different crack tips for an embodiment of the present invention.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

The shear bond between the rock and cement is influenced by the physical interface properties of the rock (e.g. friction, roughness). Moreover, cement shrinkage during cement hydration influences the bond between cement and the rock.

Experiments on the cement-steel interface bond have shown that cement shrinkage leading to shrinkage microcracks is one reason for bond reduction with time. Other reasons related to the continuous growth of the calcium hydroxide (CH) crystals and the loose packing that takes place at the interface with time leading to weak bonding.

While the bond decreases with time, the stresses due to processes in the wellbore increase with time leading to high shear stress at the cement-rock interface which can lead to microcracks. Furthermore, the swelling coefficient of some rocks such as shale has a significant impact on the bond between the cement and the rock. The higher the swelling, the weaker the bond between the between the cement and the rock.

The morphology of the rock surface also plays a significant role in the shear strength of the cement-rock interface. Formations with higher surface roughness increase the interface bond. Finally, when repair at the cement-rock interface is performed using polymer injection, an important factor is the wettability of the rock as it controls the ability of the material to penetrate the rock surface and to build a necessary bond.

In certain aspects, the embodiments of the present invention provide sealing materials that improve the quality of the interface by improving the bond between the cement and rock and the cement and steel. For one embodiment of the present invention, epoxy-siloxane may be used in an interface repair. In yet other embodiments, Novolac acrylate may be used since these provide a higher aromatic content and more crosslink sites in the pendent positions along the backbone of molecules than conventional epoxies. This provides much higher thermal stability than conventional epoxy. In yet other embodiments, polyurethane may be used since it has satisfactory performance in high temperature applications and has the unique low modulus advantage.

In yet other embodiments, the above identified materials may include therein mixtures of nanomaterials such as carbon nanotubes (CNTs), nanoAlumina, graphene nanoparticles (GNPs) and Boron nanotubes (BNTs). It has been determined that adding nanomaterials improves the restoration of the bond at the cement-rock interface.

In yet other embodiments, polymer nanocomposites with desired characteristics such as self-healing and controlled delivery may be incorporated.

To ensure effective use of CNTs in polymer composites, proper dispersion, and a good interfacial bond between the CNTs and polymer-matrix needs to be achieved. In addition, CNTs tend to hold together as bundles in the matrix due to their instinct nano-scale effect making homogeneous dispersions a major challenge. Furthermore, the relatively smooth surface of CNTs results in lack of interfacial bond between CNTs and the polymer matrix which limits load transfer from the matrix to CNTs. Therefore, to take full advantage of the extraordinary properties of CNTs, the materials should be dispersed homogeneously throughout the matrix.

To circumvent these problems, the chemical modification of CNTs and, in turn, the modification of their affinity toward solvent molecules, polymer matrices or generic reactants may be used to aid dispersion. Moreover, chemical functionalization of CNTs may be accomplished by modifying and tailoring their electrical and mechanical behavior.

Functionalized CNTs may be summarized as two covalent and non-covalent bonds. Other means to achieve efficient dispersion of the nanomaterials in epoxy is by using a mix of ultrasonication and mechanical mixing. Other dispersive methods include the use of magnetic nanoparticles. Yet other dispersive methods include the use of microstructural methods such as FTIR and TEM to ensure efficient dispersion.

CNTs may be used to improve the shear and tensile strength of epoxy and the tensile strength and failure strain limits of polymethyl-methacrylate (PMMA).

Other embodiments the present invention may include the use of a group of polymer nanocomposite materials including Novolac-epoxy (neat, incorporating multi-walled carbon nanotubes (MWCNTs), and nanoalumina), siloxane-epoxy (incorporating MWCNTs). Additional embodiments may include the use of a group of nanomaterials that achieve excellent thermal and mechanical characteristics such as GNPs and BNTs. Yet other embodiments may include the use of MWCNTs or nanoalumian that may be used in sealing the cement/steel interface.

In other embodiments of the present invention, self-healing may be achieved by incorporating microcapsules that include materials such as high molecular weight polymers (e.g. dicyclopentadiene (DCPD)) that initiate polymer cross-linking when coming into contact with a catalyst embedded in the polymer matrix (e.g. Grubbs catalyst). When overstressing takes place at the interface, the microcapsules rupture and the polymer material contacts the catalyst such that polymerization is initiated. In yet other embodiments, the present invention provides catalysts that are easier to apply than Grubbs catalysts such as bis(tricyclohexylphosphine) benzylidine ruthenium (IV) dichloride which proved to produce up to 80% recovery of interlaminar fracture toughness with epoxy. In yet other aspects, other self-healing materials that may be used include hydrogen-bonding brush polymers.

Polymers (e.g. epoxy) typically used for crack repair through injection may also be used. In addition, nanomaterials (e.g. carbon nanotubes) may also be encapsulated inside the microcapsules while a catalyst may be used in the polymer material to initiate the polymerization reaction. The microcapsules are designed to rupture when a specific pressure, temperature or humidity or gradients of these variables are reached. The material will harden at a fast rate and thus will help arrest crack propagation at the crack tip. This class of polymer nanocomposite may be used to arrest crack propagation during injection in cement, concrete, rock/geomaterials and other brittle materials.

In yet other embodiments, the present invention provides polymer nanocomposites incorporating microcapsules to achieve self-healing capabilities when high stresses are induced at the cement-substrate interface resulting in interface cracking and microcapsule rupture. This may be accomplished by incorporating microcapsules that include materials that initiate polymer cross-linking (e.g. dicyclopentadiene) when coming into contact with a catalyst embedded in the polymer matrix (e.g. Grubbs catalyst). The substrate may be rock or steel.

In yet other embodiments, the present invention provides polymer nanocomposites incorporating microcapsules that includes nanomaterials that function as an acoustic contrast agent (ACA). This material improves the acoustic contrast of the repaired media behind the casing. The release of those materials will enable efficient ultrasonic monitoring of crack propagation and crack arresting mechanisms.

In still other embodiments, the present invention provides advanced polymers that incorporate microcapsules capable of controlled delivery of the repair material. In preferred design, the microcapsules are not ruptured due to excessive stresses/cracking of the interface but rather when a specific combination of pressure, temperature and/or humidity or their gradients around the capsules is achieved. This allows for targeting and controlling the rate of delivery of the repair material at the rock interface. This, in turn, will limit crack front propagation due to the increased pressure associated with injecting the repair material. As previously stated, materials that may be used for this embodiment include, but are not limited to, the group of polymer nanocomposite material including Novolac epoxy (neat, incorporating multi-walled carbon nanotubes (MWCNTs), and nanoalumina), and siloxane epoxy (incorporating MWCNTs). We also suggest the possible use of polyurethane or Methyl poly methacrylate or other polymers.

While epoxy has proved repeatedly its superior ability to achieve required flowability and bond, polyurethane has proved capable to perform in high temperature and has the unique low modulus advantage. Significant improvement of shear strength, fracture toughness and creep characteristics in epoxy may be obtained by using carbon nanotubes. Novolac acrylate provides a higher aromatic content and more crosslink sites in the pendent positions along the backbone of molecules than conventional epoxies. This provides much higher thermal stability than conventional epoxy. Polymethyl methacrylate may also be used because of its wettability characteristics. Siloxane epoxy has a wide range of wettability characteristics that can be altered by temperature.

TABLE 1

Matrix of polymer nanocomposites

| Polymers | Nanomaterials | | | | |
| --- | --- | --- | --- | --- | --- |
| | Neat | MWCNTs | Nanoalumina | GNPs | BNTs |
| Epoxy-Siloxane | ✓ | ✓ | ✓ | ✓ | ✓ |
| Epoxy-Novolac | ✓ | ✓ | ✓ | ✓ | ✓ |
| Polyurethane | ✓ | ✓ | ✓ | ✓ | ✓ |
| Polymethyl methacrylate | ✓ | ✓ | ✓ | ✓ | ✓ |

In one preferred embodiment for repairing a cement-rock interface, a repair material 100 is injected between the rock 102 which may be a rock such as shale and cement 104, as known to those of ordinary skill in the art as shown in FIG. 1A. As shown in FIG. 1B, material 100 may include one or more microcapsules 110-112 which may include high molecular weight polymers and nanomaterials as described above. Also included in material 100 are one or more catalyst 120-121. When overstressing, cracking, or delamination 105 takes place at interface between shale 102 and cement 104 (FIG. 1C), one or more microcapsules such as microcapsule 110 will be ruptured and the released contents will react with catalyst 120-121. Once the released polymer contacts the catalyst, polymerization 130 takes place (see FIGS. 1D-1E). As shown in FIG. 1F, once the high molecular polymer reacts with the catalyst, it hardens into material 150 restoring the integrity of the interface. Also, the microcapsules, as described above, may be sensitive for temperature, pressure and/or humidity or their gradients for controlled delivery capability.

FIGS. 2A-2C and FIG. 3 illustrate another preferred embodiment of the present invention which may be used to arrest cracks at the crack tips during the injection of a repair material. When repair material 200 is injected, it will reach crack tips 201 and 203 which may form in rock 202. As shown in FIG. 2B, material 200 may include one or more microcapsules 210-211 which may include high molecular weight polymers and nanomaterials as described above. Also, the microcapsules, as described above, may be sensitive for a predetermined temperature, pressure, humidity, their gradients or combinations thereof for controlled delivery capability. Material 200 may also include one or more catalyst 220-221.

As shown in FIG. 2C, section 222 represents reacted polymer that has hardened at the crack tip 202. Section 230 represents reacting polymers and catalysts. Section 240 shows unreacted microencapsulated polymers and catalysts.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A microencapsulated crack arrest material comprising: a polymer matrix incorporating one or more microcapsules, said microcapsules rupture in response to a predetermined humidity gradient include materials that initiate cross-linking when contacting a catalyst.

2. The material of claim 1 wherein said microcapsules rupture in response to a predetermined humidity gradient and a predetermined temperature gradient.

3. The material of claim 1 wherein said microcapsules include dicyclopentadiene to initiate polymer cross-linking when contacting a catalyst.

4. The material of claim 1 wherein said microcapsules rupture to release their contents to react with a catalyst in response a predetermined temperature gradient at one or more crack tips and bonds to the crack tip surface to prevent crack propagation.

5. The material of claim 1 wherein said microcapsules include one or more materials from the group comprising: graphene nanoparticles, Novolac-epoxy, Novolac-epoxy incorporating carbon nanotubes, siloxane-epoxy incorporating MWCNTs; BNTs; MWCNTs or nanoalumina, methyl methacrylate, methyl methacrylate incorporating nanoalumina, methyl methacrylate incorporating MWCNTs.

6. The material of claim 5 wherein said carbon nanotubes are adapted to disperse homogeneously in the matrix.

7. The material of claim 5 wherein said carbon nanotubes are chemically modified to have an affinity toward solvent molecules, polymer matrices or generic reactants.

8. The material of claim 1 wherein said microcapsules incorporate magnetic nanoparticles.

9. The material of claim 1 further including one or more catalysts such as bis(tricyclohexylphosphine) benzylidine ruthenium (IV) dichloride.

10. The material of claim 1 further including nanomaterials that enable ultrasonic monitoring of crack propagation and crack arrest.

11. A microencapsulated crack arrest material comprising: a polymer matrix incorporating one or more microcapsules, said microcapsules incorporate magnetic nanoparticles and rupture in response to a predetermined humidity.

12. The material of claim 11 wherein said microcapsules rupture in response to a predetermined humidity gradient and a predetermined temperature gradient.

13. The material of claim 11 wherein said microcapsules include materials that initiate polymer cross-linking when contacting a catalyst.

14. The material of claim 13 wherein said microcapsules include dicyclopentadiene to initiate polymer cross-linking when contacting a catalyst.

15. The material of claim 11 wherein said microcapsules rupture to release their contents to react with a catalyst in response a predetermined temperature gradient at one or more crack tips and bonds to the crack tip surface to prevent crack propagation.

16. The material of claim 11 wherein said microcapsules include one or more materials from the group comprising: graphene nanoparticles, Novolac-epoxy, Novolac-epoxy incorporating carbon nanotubes, siloxane-epoxy incorporating MWCNTs; BNTs; MWCNTs or nanoalumina, methyl methacrylate, methyl methacrylate incorporating nanoalumina, methyl methacrylate incorporating MWCNTs.

17. The material of claim 16 wherein said carbon nanotubes are adapted to disperse homogeneously in the matrix.

18. The material of claim 16 wherein said carbon nanotubes are chemically modified to have an affinity toward solvent molecules, polymer matrices or generic reactants.

19. The material of claim 11 further including one or more catalysts such as bis(tricyclohexylphosphine) benzylidine ruthenium (IV) dichloride.

20. The material of claim 11 further including nanomaterials that enable ultrasonic monitoring of crack propagation and crack arrest.

\* \* \* \* \*